United States Patent [19]

Rafalko

[11] Patent Number: 4,877,849

[45] Date of Patent: Oct. 31, 1989

[54] OXYFORMYLATED SUBSTITUTED POLYBENZIMIDAZOLE ARTICLE

[75] Inventor: Joseph J. Rafalko, Chatham, N.J.

[73] Assignee: Hoechst Celanese Corporation, Somervill, N.J.

[21] Appl. No.: 86,020

[22] Filed: Aug. 17, 1987

[51] Int. Cl.$^4$ ............................................. C08G 69/26
[52] U.S. Cl. .................................... 525/433; 525/420; 525/435; 528/331; 528/342
[58] Field of Search ....................... 525/433, 420, 435; 528/342, 331

[56] References Cited

U.S. PATENT DOCUMENTS 3,408,336 10/1968 Benson ................................. 528/342
4,599,388 7/1986 Bower et al. ........................ 528/342
4,734,466 3/1988 Kindler et al. ...................... 525/433

*Primary Examiner*—Harold D. Anderson
*Attorney, Agent, or Firm*—Lynch, Cox, Gilman & Mahan

[57] ABSTRACT

This invention discloses a process for the preparation of substituted polybenzimidazole polymers by reacting an unsubstituted polybenzimidazole polymer with a pyrocarbonate to produce an oxyformulated polybenzimidazole polymer. The oxyformulated polybenzimidazole polymer can be heated to convert it to an N-substituted polybenzimidazole polymer. Membranes, fibers and other products produced from the products of these reactions are highly resistant to chemical reactions with broad utility as fibers or membranes.

31 Claims, No Drawings

OXYFORMYLATED SUBSTITUTED POLYBENZIMIDAZOLE ARTICLE

BACKGROUND OF THE INVENTION

1. Field of the Invention

This invention relates to substituted polybenzimidazole articles. In particular, this invention relates to processes for the production of substituted polybenzimidazole articles by reacting a pyrocarbonate with an unsubstituted polybenzimidazole polymer.

2. Prior Art

Polybenzimidazoles are a well known class of polymers characterized by a high degree of thermal stability and resistance to chemical reaction. As a result polybenzimidazoles have found application in a wise variety of end uses. For example, polybenzimidazole fibers are useful as insulating materials that do not give off toxic fumes when heated. Such fibers are particularly suited for use where high temperature resistance is important. Polybenzimidazoles have also been used as membranes, ultrafilters, reverse osmosis devices and for other separatory functions.

While polybenzimidazole products are generally resistant to chemical reaction, they are sometimes subject to attach at the imidazole nitrogen-hydrogen bond by strong acids. To limit their susceptibility to chemical reaction and improve their performance, polybenzimidazole polymers can be chemically modified. For example, the crosslinking of polybenzimidazole polymers, as described in U.S. Pat. Nos. 4,020,142 and 4,154,919, increases their resistance to chemical attack by removing the reactive nitrogen-hydrogen bond on the imidazole ring.

In another effort to prevent chemical reaction at the imidazole nitrogen-hydrogen bond, substituted polybenzimidazole polymers have been prepared. For example, U.S. Pat. No. 4,377,546 discloses a substituted polybenzimidazole which is part of a polymeric alloy wherein the hydrogen on the imidazole nitrogen has been replaced by a phenyl group.

U.S. Pat. No. 3,578,644 discloses the substitution of an hydroxyl substituent onto a polybenzimidazole polymer by the reaction of a polybenzimidazole polymer with an omega-haloalkanol or a 1,2-alkylene oxide. The reaction requires the presence of a basic catalyst and an organic salt is formed as a by-product. In addition, because of the use of gaseous alkylene oxide, a pressurized reaction container is necessary as the reaction vessel. Further, the halo-alkanol reaction does not produce an hydroxyl substitution on some types of polybenzimidazole polymers, such as poly-2,2-(m-phenylene)-5-,5'-bibenzimdiazole and other similar polybenzimidazoles because of steric hindrance between the reactive imidazole rings. See also U.S. Pat. No. 4,599,388, for another hydroxyl substituted polybenzimidazole polymer.

U.S. Pat. No. 3,943,125 discloses various substituted polybenzimidazole polymers, which are produced by the reaction of substituted tetramino pyridines or their acid salts with a suitable acid halide or dianhydride. The resulting precyclized intermediates are cyclodehydrated and crosslinked to produce various substituted polybenzimidazole polymers. However, the percentage of substituted polybenzimidazole polymers produced by this reaction ranges only between about 20 and 40 percent of the available polybenzimidazole polymer. Further, although the '125 patent broadly discloses a large number of substituted tetramino compounds, it fails to specifically describe them. In addition, the process for preparation of these substituted polybenzimidazole polymers is significantly different from the process of the instant invention.

U.S. Pat. No. 3,518,234 discloses a process for the preparation of N-aryl substituted polybenzimidazole polymers by cyclodehydrating the precursor compounds with an acidic substance, such as polyphosphoric acid or p-toluenesulfonic acid. However, the substituted polybenzimidazole polymer produced is not obtained by direct reaction with a polybenzimidazole polymer and substantial heating of the reaction vessel is necessary to achieve the desired end product. See also U.S. Pat. No. 4.579,915.

It is therefore an object of this invention to produce novel aryl and alkyl substituted polybenzimidazole polymers.

It is an additional object of this invention to produce aryl and alkyl substituted polybenzimidazole polymers using an unsubstituted polybenzimidazole polymer as the precursor material.

It is a further object of this invention to produce aryl and alkyl substituted polybenzimidazoles wherein the substitution is substantially complete.

It is a still further object of the present invention to produce substituted polybenzimidazole products which show a high degree of resistance to chemical attack and which are stable at high temperatures.

These and other objects as well as the scope, nature and utilization of this invention will be apparent to those skilled in the art from the following detailed description and appended claims.

SUMMARY OF THE INVENTION

The present invention involves a process for the production of alkyl and aryl substituted polybenzimidazoles polymers as follows:

a. preparing a plybenzimidazole polymer solvent solution;

b. reacting the polybenzimidazole polymer with pyrocarbonate of the general formula:

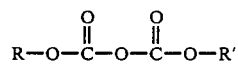

wherein R and R' may be the same as or different from each other and comprise a substituted or unsubstituted aryl or $C_1$-$C_6$ alkyl substitutent, to form a substituted or unsubstituted aryl or $C_1$-$C_6$ alkyl oxyformylated polybenzimidazole polyer; and c. heating the substituted or unsubstituted aryl or $C_1$-$C_6$ alkyl oxyformylated polybenzimidazole to produce a substituted or unsubstituted aryl or $C_1$-$C_6$ alkyl substituted polybenzimidazole polymer.

The substituted polybenzimidazole polymer produced by this process can be formed into films, fibers and other such products similar to those produced from unsubstituted polybenzimidazole polymers. However, because these polymers are substantially substituted, articles produced from them are more resistant to chemical reaction than unsubstituted polybenzimidazole articles.

DETAILED DESCRIPTION OF INVENTION

A. The Starting Polymer

The polybenzimidazole starting material for this process is a linear polybenzimidazole. Typical polymers of this class and their preparation are more fully described in U.S. Pat. No. 2,895,948, U.S. Re. Patent No. 26,065 and in the *Journal of Polymer Science,* Vol. 50, pages 511–539 (1961) which are herein incorporated by reference. The polybenzimidazoles consist essentially of recurring units of the following Formulas I and II:

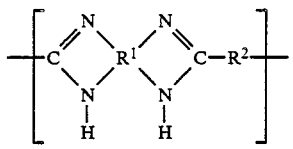

FORMULA I where $R^1$ is a tetravalent aromatic nucleus with the nitrogen atoms forming the benzimidazole rings being paired upon adjacent carbon atoms, and $R^2$ is a divalent substituent selected from aliphatic, alicyclic and aromatic radicals containing between about 2 and about 20 carbon atoms.

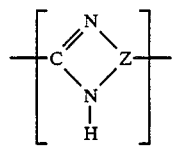

FORMULA II wherein Z is an aromatic nucleus having the nitrogen atoms forming the benzimidazole ring paired upon adjacent carbon atoms of the aromatic nucleus.

Preferably, aromatic polybenzimidazoles are selected, e.g., from polymers consisting essentially of the recurring units of Formulas I and II wherein $R^1$ is an aromatic ring or a heterocyclic ring.

As set forth, polybenzimidazoles having the recurring units of Formula II may be prepared by self-condensing a trifunctional aromatic compound containing only a single set of ortho-disposed diamino substitutants and an aromatic, preferably phenyl, carboxylate ester substitutent. Exemplary of polymers of this type is poly-2,5(6)-benzimidazole prepared by the autocondensation of phenyl-3,4-diminobenzoate.

As also set forth in the above-mentioned documents, the aromatic polybenzimidazoles having the recurring units of Formula I may be prepared by condensing an aromatic tetraamine compound containing a pair of ortho-diamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the group consisting pyridine, pyrazine, furan, quinoline, thiophene and pyran and (c) an anhydridge of an aromatic dicarboxylic acid.

Examples of polybenzimidazoles which have the recurring structure of Formula I are as follows:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-benzimidazole;
poly-2,2'-(m-phenylene)-diimidazolbenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) methane;
poly-2'2"-(m-phenylene)-5,5'-di(benzimidazole) ethylene-1,2.

The preferred polybenzimidazole for use in the present process is one prepared from poly-2,2'-(m-phenylene)-5,5'-bibenzimidazole, the recurring unit of which is:

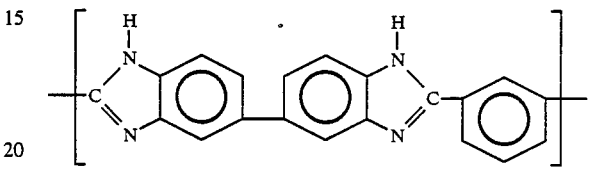

Any polymerization process known to those skilled in the art may be employed to prepare the polybenzimidazole which is utilized as the starting material for the present invention. With respect to aromatic polybenzimidazoles, preferably, equimolar quantities of the monomeric tetraamine and dicarboxyl compound may be introduced into a first step melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed. Usually, the first stage reaction is continued until a prepolymer is formed having an inherent viscosity, expressed as deciliters per gram, of at least 0.1, and preferably from about 0.13 to 0.3 (determined from a solution of 0.4 grams of the polymer in 100 milliliters of 97 percent $H_2SO_4$ at 25° C.).

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone where it is heated under substantially oxygen-free conditions, as described above, to yield a polybenzimidazole polymer product, desirably having an I.V., as measured above, of at least 0.4, (e.g., 0.8 to 1.1 or more). When the polybenzimidazole polymer is to be utilized in the form of a hollow fiber, its preferred inherent viscosity is at least about 0.5, most preferably in the range of about 0.7 to about 1.4.

The temperature employed in the second stage is at least 250° C., preferably at least 325° C., and more preferably from about 350° to 425° C. The second stage reaction generally takes at least 0.5 hours, and preferably from about 1 to about 4 hours or more. It is, of course, also possible to prepare the instant polymers via a one-step reaction. However, the previously-described two-step process is preferred.

B. The Polymer Solution

The solvents utilized to form the polybenzimidazole polymer solution include those solvents which are commonly-recognized as being capable of dissolving the particular polybenzimidazole polymer. For instance, the solvents may be selected from those commonly utilized in the formation of polybenzimidazole dry spinning solutions including N,N-dimethylacetamide, N,N-dimethylformamide, dimethylsulfoxide, and N-methyl-2-pyrrolidone. The particularly preferred solvent is N,N-dimethylacetamide. Additional representative solvents include formic acid, acetic acid, and sulfuric acid.

The polymer solution may be prepared, for example, by dissolving sufficient polybenzimidazole in the solvent to yield a final solution containing from about 1 to about 30 percent of the polymer by weight based on the total weight of the solution. When the solution contains concentrations of polybenzimidazole less than about 5 percent, the substitution at the imidazole nitrogen is less than optimum. When concentrations of the polybenzimidazole polymer approach about 35 percent, the polybenzimidazole solution must be heated to complete the reaction with the pyrocarbonate. In a preferred embodiment, the concentration of the polybenzimidazole polymer in the solution should range from about 5 to about 20 percent, by weight. The quantity of the polybenzimidazole polymer dissolved in the solvent should be such that the resulting solution has a viscosity of about 50 to about 4,000 poises at 30° C., and preferably from about 400 to about 600 poises.

One suitable means for dissolving the polymer in the solvent is by mixing the materials at a temperature above the normal boiling point of the solvent, for example, about 25° to about 120° C. above such boiling point, and at a pressure of about 2 to about 15 atmospheres for a period of about 1 to about 5 hours under constant stirring. The resulting solution is preferably filtered to remove any undissolved polymer. A minor amount of lithium chloride (from about 0.5 to about 5 percent by weight based on the weight of the polybenzimidazole polymer) optionally may be added to the solution to prevent the polybenzimidazole polymer from phasing out of the solution upon standing for extended periods of time.

C. The Pyrocarbonate Reaction

To the polybenzimidazole solution prepared above is added a pyrocarbonate whose general formula is:

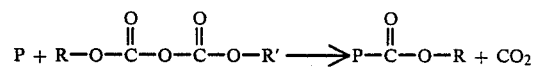

wherein R and R' may be the same as or different from each other and are selected from the group consisting of monovalent $C_1$-$C_6$ alkyl, aryl or substituted aryl groups where the substituents may be selected from the group consisting of methyl, ethyl, phenyl, pyridyl and cyano. In a preferred embodiment the pyrocarbonate is diethyl pyrocarbonate.

An amount in excess of a stoichiometric concentration of the carbonate substitutent of the pyrocarbonate for each imidazole nitrogen/hydrogen site should be added to the polybenzimidazole polymer solution to achieve complete substitution. When concentrations of the carbonate unit of the pyrocarbonate are approximately stoichiometric, at least about 60 percent of the imidazole nitrogen sites are substituted. However, if lesser substitutions are desired, lesser concentrations of the pyrocarbonate can be used. In a preferred embodiment, to achieve virtually complete substitution, the ratio of carbonate units to each imidazole nitrogen site should be at least about 1.2 to 1 and, in a more preferred embodiment, should range from about 2 to 1 to about 5 to 1.

The pyrocarbonate may simply be added dropwise to the polybenzimidazole polymer solution at room temperature. If desired, however, the reaction time may be reduced by heating the reaction solution to a temperature up to about 100° C. If the concentration of the polybenzimidazole in the original solution is above about 25 percent by weight, heat may need to be supplied to the reaction solution to complete the reaction. When these higher concentrations of polybenzimidazole are used, the solution may be heated to a temperature up to about 100° C. It is important, however, that the solution not be heated above about 100° C. because the product produced by the reaction may spontaneously degrade to the original polybenzimidazole polymer, if the product is heated above about 100° C.

The reaction preferably should be carried out under constant stirring and requires a reaction time of about 1 to about 5 hours. In the preferred embodiment the reaction time is about 2 to about 3 hours. During the reaction, carbon dioxide gas may bubble out of the solution as a by product.

The general reaction scheme is as follows:

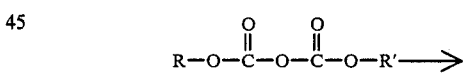

wherein R and R' are as previously disclosed and P is the polybenzimdiazole residiuum.

In an example of the instant process, a polybenzimidazole polymer having the recurring units of Formula I is reacted with a pyrocarbonate to produce the oxyformylated polybenzimidazole as follows:

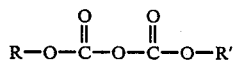

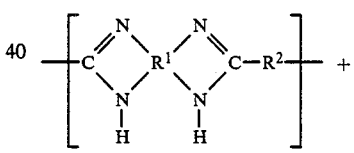

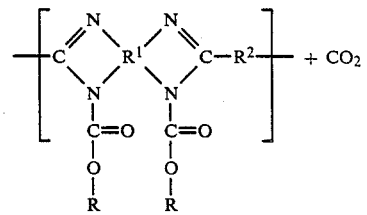

wherein R, R', $R^1$ and $R^2$ are as previously disclosed. In a preferred embodiment, the reaction of a polybenzimidazole polymer with diethyl pyrocarbonate produces an oxyformylated polybenzimidazole polymer.

Following the pyrocarbonate reaction, at least a stoichometric quantity of a non-solvent for the substituted polybenzimidazole is added to the reaction vessel to precipitate out the resulting oxyformylated polybenzimidazole polymer. Water is preferably used as the precipitating agent, although other non-solvents, such as acetone, may also be used. The substituted polybenzimidazole polymer is then filtered and washed with a non-solvent that does not contain OH⁻ or NH⁺ moities to remove any excess water or solvent. Preferably, the non-solvent wash solution is acetone.

While the substituted oxyformylated polybenzimidazole polymer prepared from this process may be formed into useful byproducts such as membranes, or other separatory media, it is principally used as a precursor to the formation of substituted or unsubstituted aryl or $C_1$-$C_6$ alkyl substituted polybenzimidazoles. Substituted oxyformylated polybenzimidazoles, if not converted into a substituted or unsubstituted aryl or $C_1$-$C_6$ alkyl substituted polybenzimidazole polymer, may spontaneously degrade at room temperature to unsubstituted polybenzimidazole polymers over long periods of time.

D. Formation of Aryl or Alkyl Substituted Polybenzimidazole Polymers

The oxyformylated polybenzimidazole polymer produced from the prior process may be converted into a substituted or unsubstituted aryl or alkyl substituted polybenzimidazole polymer by heating the oxyformylated polybenzimidazole polymer in its solid form. The temperature needed to convert the oxyformylated polybenzimidazole polymer to the N-substituted polybenzimidazole polymer will vary depending on the composition of the oxyformylated polybenzimidazole polymer. In a preferred embodiment, the oxyformulated polybenzimidazole polymer is heated to a temperature of about 150° C. to about 350° C. When the oxyformylated polybenzimidazole polymer is ethoxyformulated polybenzimidazole polymer, it rapidly converts into N-ethyl polybenzimidazole when it is heated to a temperature from about 200° C. to about 250° C. The reaction goes to completion in about 2 to about 90 minutes. If a lower heating temperature is used, from about 150° C. to about 200° C., the conversion reaction requires from about 15 minutes to about 90 minutes to go to completion.

When the oxyformulated polybenzimidazole polymer is heated to a sufficient temperature, the conversion is virtually 100 percent. This conversion may be confirmed by infrared spectroscopy or any other conventional analysis means.

The general reaction scheme is as follows:

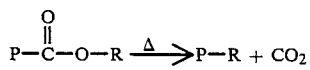

wherein P and R are as previously disclosed.

In an example of the instant process, the conversion of the oxyformylated polybenzimidazole polymer, as previously disclosed, to the N-alkyl polybenzimidazole polymer goes to completion by the following reaction:

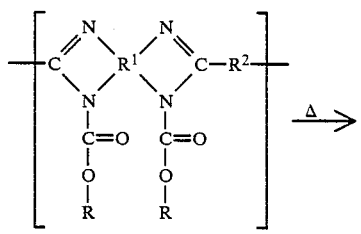

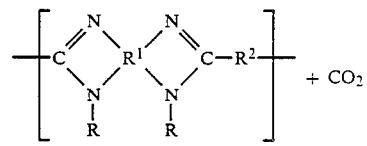

wherein R, R', $R^1$ and $R^2$ alkyl substituted polybenzimidazole polymers produced by this process have a wide range of utility, particularly in the separatory field. Membranes, fibers or films made from this polybenzimidazole derivative resist chemical reaction because of their high degree of substitution. These substituted polybenzimidazole membranes once positioned upon a conventional porous support, such as a porous steel plate, or arranged in hollow filament bundles may be utilized to separate the components of a solution by a variety of well-known techniques, such as reverse osmosis, electrodialysis or ultrafiltration. For instance, membranes produced from the instant invention may be used to good advantage in those areas where cellulose acetate membranes have been used heretofore. Because of the increased thermal and chemical stability exhibited by the substituted polybenzimidazole membranes, a greater range of operating conditions may be employed.

The following examples are given as specific illustrations of the invention. All parts and percentages are by weight, unless otherwise stated. It is understood, however, that the invention is not limited to the specific details set forth in the examples.

EXAMPLE I

To a round bottom reaction flask were added 120 ml of a 4 percent by weight poly-2,2-(m-phenylene)-5,5'-bibenzimidazole (0.3 I.V.) in N-dimethylacetamide and 5 ml. of diethylpyrocarbonate. The contents of the flask were stirred for 2 hours at 25° C. (room temperature). An additional 10 ml. of diethyprocarbonate were added to the reaction vessel and the solution was heated at 80° C. for 2 hours. The solution was then cooled to room temperature and allowed to stand for 16 hours.

The resulting ethoxyformulated polybenzimidazole, which was first precipitated by mixing the reaction mixture with 200 ml. of water, was washed with 100 ml. acetone and air dried, producing 4.2 gms of a white precipitate. Using infrared spectroscopy, the polybenzimidazole polymer was determined to be approximately 100 percent oxyformylated.

EXAMPLE II 1.0 gram of the oxyformylated polybenzimidazole polymer obtained by the process of Example I was heated in an oven to a temperature of 220° C. for two minutes. After this heating process, 0.8 grams of material remained which was analyzed using infrared spectroscopy. The analysis showed the presence of N-ethyl substituted polybenzimidazole which was approximately 100 percent substituted. The weight lose of approximately 20 percent presumably was from the loss of $CO_2$. The expected weight loss for conversion to a 100 percent substituted N-ethyl polybenzimidazole is in the range of 19.5 percent.

As can be seen, the reaction of a polybenzimidazole polymer with a pyrocarbonate produces an oxyformylated polybenzimidazole polymer which is easily convertible into an alkyl or aryl substituted polybenzimidazole polymer. By this process substitutions approaching 100 percent are easily achieved. The products produced from these reactions are stable, non-reactive and highly resistant to high temperatures. They are quite useful for the preparation of separatory media.

What is claimed:

1. A process for producing a substituted polybenzimidazole polymer which comprises the steps of:
   (a) preparing a polybenzimidazole polymer solvent solution; and
   (b) reacting the polybenzimidazole polymer with a pyrocarbonate to form an aryl or alkyl oxyformylated polybenzimidazole polymer.

2. A process for producing a substituted polybenzimidazole polymer which comprises the steps of:
   (a) preparing a polybenzimidazole polymer solvent solution;
   (b) reacting the plybenzimidazole polymer with a pyrocarbonate to form an aryl or alkyl oxyformylated polybenzimidazole polymer, and
   (c) heating the aryl or alkyl oxyformylated polybenzimidazole polymer to form a substituted polybenzimidazole polymer.

3. The process as in any of claims 1 or 2 wherein the pyrocarbonate has a general formula:

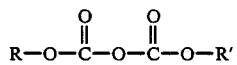

wherein R and R' are the same as or different from each other and represent a monovalent member selected from the group cnsisting of $C_1$-$C_6$ alkyl, aryl and substituted aryl radicals, wherein the substituents are selected from the group consisting of methyl, ethyl, phenyl, pyridyl and cyano.

4. The process as in any of claims 1 or 2 wherein the pyrocarbonate is diethylpyrocarbonate.

5. The process as in any of claims 1 or 2 wherein the substituted aryl or alkyl oxyformylated polybenzimidazole has the general formula of:

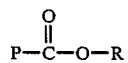

wherein R represents a monovalent member selected from the group consisting of $C_1$-$C_6$ alkyl, aryl or substituted aryl radicals wherein the substituents are selected from the group consisting of methyl, ethyl, phenyl, pyridyl and cyano, wherein P represents a polybenzimidazole residiuum and wherein the —C—O—R radical is attached to the imidazole nitrogen of the polybenzimidazole residiuum.

6. The process as in any of claims 1 or 2 wherein the substituted aryl or alkyl oxyformylated polybenzimidazole is ethoxyformylated polybenzimidazole.

7. The process as in any of claims 1 or 2 wherein at least about 60 percent of the imidazole nitrogen/hydrogen sites on the polybenzimidazole polymer are substituted with an aryl or alkyl oxyformylated substituent.

8. The process as in any of claims 1 or 2 wherein the concentration of the polybenzimidazole polymer in the solvent solution is from about 1 to about 30 percent, by weight based on the total solution weight.

9. The process as in any of claims 1 or 2 wherein the concentration of the polybenzimidazole polymer in the solvent solution is from about 5 to about 20 percent, by weight based on the total solution weight.

10. The process as in any of claims 1 or 2 wherein the polybenzimidazole polymer starting material is characterized by recurring monomeric units of:

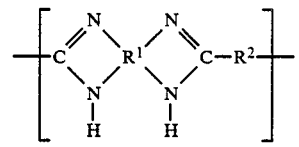

wherein $R^1$ is a tetravalent aromatic nucleus with the nitrogen atoms forming the benzimidazole rings being paired upon adjacent carbon atoms, and $R^2$ is a divalent substituent selected from the group consisting of aliphatic, alicyclic and aromatic radicals containing between about 2 and about 20 carbon atoms.

11. The process as in any of claims 1 or 2 wherein the polybenzimidazole polymer starting material is comprised of recurring monomeric units of:

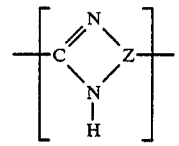

wherein Z is an aromatic nucleus having the nitrogen atoms forming the benzimidazole ring paired upon adjacent carbon atoms of the aromatic nucleus.

12. The process as in any of claims 1 or 2 wherein the polybenzimidazole polymer is poly-2,2'-(m-phenylene)-5,5'-bibenzimidazole.

13. The process as in any of claims 1 or 2 wherein the solvent capable of dissolving the polybenzimidazole polymer is selected from the group consisting of N,N-dimethylacetamide, N,N-dimethylformamide, dimethylsulfoxide and N-dimethyl-2-pyrrolidone.

14. The process of claim 13 wherein the solvent is N,N-dimethylacetamide.

15. The process as in any of claims 1 or 2 wherein at least a stoichiometric concentration of the carbonate substituent of the pyrocarbonate with respect to the imidazole nitrogen/hydrogen sites on the polybenzimidazole polymer is reacted with the polybenzimidazole polymer.

16. The process of claim 2 wherein the aryl or alkyl oxyformylated polybenzimidazole is heated to a temperature between about 150° C. and about 350° C.

17. The process of claim 2 wherein the aryl or alkyl oxyformylated polybenzimidazole is heated to a temperature between about 200° C. and about 250° C.

18. The process of claim 2 wherein the aryl or alkyl oxyformylated polybenzimidazole is heated for a period of about 2 to about 90 minutes.

19. The process of claim 2 wherein the substituted polybenzimidazole is N-ethyl polybenzimidazole.

20. The process of claim 2 wherein the reactive imidazole nitrogen/hydrogen sites on the polybenzimidazole polymer are substituted at least about 60 percent with a $C_1$-$C_6$ alkyl, aryl or substituted aryl group wherein the substituents are selected from the group consisting of methyl, ethyl, phenyl, pyridyl and cyano.

21. A process for producing a substituted polybenzimidazole polymer which comprises the following steps:
(a) preparing a solvent solution of a polybenzimidazole polymer consisting essentially of recurring units of the following formula:

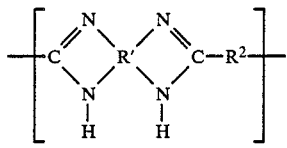

where R' is a tetravalent aromatic nucleus with the nitrogen atoms forming the benzimidazole rings being paired upon adjacent carbon atoms, and $R^2$ is a divalent substituent selected from the group consisting of aliphatic, alicyclic and aromatic radicals containing between about 2 and about 20 carbon atoms; and
(b) reacting the polybenzimidazole polymer with a pyrocarbonate which has a general formula of:

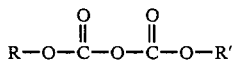

wherein R and R' are the same as or different from each other and represent a monovalent $C_1$-$C_6$ alkyl, aryl or a substituted aryl radical wherein the substituents are selected from the group consisting of methyl, ethyl, phenyl, pyridyl and cyano, to form aryl or alkyl oxyformylated polybenzimidazole polymer.

22. A process for producing a substituted polybenzimidazole polymer which comprises the following steps:
(a) preparing a poly-2,2'(m-phenylene)-5,5'-bibenzimidazole polymer solution in N,N-dimethylacetamide; and
(b) reacting the polymer with diethylpyrocarbonate to form ethoxyformylated polybenzimidazole.

23. A process for producing a substituted polybenzimidazole polymer which comprises the following steps:
(a) preparing a solvent solution of a polybenzimidazole polymer consisting essentially of recurring units of the following formula:

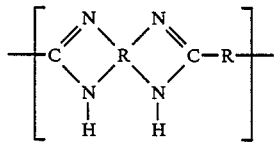

where R is a tetravalent aromatic nucleus with the nitrogen atoms forming the benzimidazole rings being paired upon adjacent carbon atoms, and R is a divalent substituent selected from the group consisting of aliphatic, alicyclic and aromatic radicals containing between about 2 to about 20 carbon atoms; and
(b) reacting the polybenzimidazole polymer with a pyrocarbonate which has a general formula of:

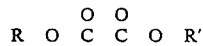

wherein R and R' are the same as or different from each other and represent a monovalent C -C alkyl, aryl or a substituted aryl radical wherein the substituents are sekected from the group consisting of methyl, ethyl, phenyl, pyridyl and cyano to form an aryl or alkyl oxyformylated polybenzimidazole polymer; and
(c) heating the substituted aryl or alkyl oxyformylated polybenzimidazole polymer to a temperature from about 150° C. to about 350° C. for a period of about 2 to about 90 minutes to form a substituted polybenzimidazole polymer.

24. A process for producing a substituted polybenzimidazole polymer which comprises the following steps:
(a) preparing a poly-2,2'-(m-phenylene)-5,5'-bibenzimidazole polymer solution in N,N-dimethylacetamide;
(b) reacting the polymer with diethylpyrocarbonate to form ethoxyformulated polybenzimidazole; and
(c) heating the ethoxyformulated polybenzimidazole to a temperature from about 200° C. to about 250° C. for a period of about 2 to about 90 minutes to form N-ethyl polybenzimidazole.

25. The aryl or alkyl oxyformylated polybenzimidazole polymer produced by the process of claim 1.

26. The substituted polybenzimidazole polymer produced by the process of claim 2.

27. The aryl or alkyl oxyformylated polybenzimidazole polymer produced by the process of claim 21.

28. The ethoxyformylated polybenzimidazole polymer produced by the process of claim 23.

29. The substituted polybenzimidazole polymer produced by the process of claim 24.

30. The N-ethyl polybenzimidazole polymer produced by the process of claim 24.

31. A substituted polybenzimidazole polymer having the general formula of:

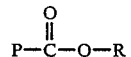

wherein R represents a monovalent member selected from the group cnsisting of $C_1$-$C_6$ alkyl, aryl or substituted aryl members wherein the substituents are selected from the group consisting of methyl, ethyl, phenyl, pyridyl, cyano, wherein P represents a polybenzimidazole residiuum and wherein the —C—OR radical is attached to the imidazole nitrogen of the polybenzimidazole residiuum.

* * * * *

UNITED STATES PATENT AND TRADEMARK OFFICE
CERTIFICATE OF CORRECTION

PATENT NO. : 4,877,849

DATED : October 31, 1989

INVENTOR(S) : Joseph J. Rafalko

It is certified that error appears in the above-identified patent and that said Letters Patent is hereby corrected as shown below:

Column 2, line 40, delete "plybenzimidazole" and insert --Polybenzimidazole--.

Column 3, line 46, delete "phenyl-3,4-diminobenzoate" and insert --phenyl-3,4-diaminobenzoate--.

Column 3, line 58, delete "anhydridge" and insert --anhydride--.

Column 4, line 1, delete "poly-2,2'-(m-phenylene)-diimidazolbenzene" and insert --poly-2,6-m-(phenylene)-diimidazolbenzene--.

Column 6, line 32, delete "polybenzimdiazole" and insert --polybenzimidazole--.

Column 7, lines 29-30, delete "oxyformulated" and insert --oxyformylated--.

Column 7, lines 32-33, delete "ethoxyformulated" and insert --ethoxyformylated--.

Column 7, line 41, delete "oxyformulated" and insert --oxyformylated--.

Column 8, line 39, delete "diethyprocarbonate" and insert --diethylpyrocarbonate--.

Column 8, line 60, delete "lose" and insert "loss".

Column 9, line 18, delete "plybenzimidazole" and insert --polybenzimidazole--.

Column 9, line 33, delete "cnsisting" and insert --consisting--.

UNITED STATES PATENT AND TRADEMARK OFFICE
CERTIFICATE OF CORRECTION

PATENT NO. : 4,877,849

DATED : October 31, 1989

INVENTOR(S) : Joseph J. Rafalko

It is certified that error appears in the above-identified patent and that said Letters Patent is hereby corrected as shown below:

Column 12, lines 6-8, delete $$"R\overset{O}{C}\overset{O}{C}R'"$$

and insert $$--R-O-\overset{O}{\overset{\|}{C}}-\overset{O}{\overset{\|}{C}}-O-R'--$$

Column 12, line 12, delete "sekected" and insert --selected--.

Column 12, line 28, delete "ethoxyformulated" and insert --ethoxyformylated--.

Signed and Sealed this

Ninth Day of June, 1992

Attest:

DOUGLAS B. COMER

*Attesting Officer*  *Acting Commissioner of Patents and Trademarks*